United States Patent
Mohindra

(10) Patent No.: US 6,366,604 B1
(45) Date of Patent: Apr. 2, 2002

(54) COMPENSATION FOR PHASE ERRORS CAUSED BY CLOCK JITTER IN A CDMA COMMUNICATION SYSTEM

(75) Inventor: Rishi Mohindra, Milpitas, CA (US)

(73) Assignee: Philips Electric North America Corporation, New York, NY (US)

( * ) Notice: Subject to any disclaimer, the term of this patent is extended or adjusted under 35 U.S.C. 154(b) by 0 days.

(21) Appl. No.: 09/216,260

(22) Filed: Dec. 18, 1998

(51) Int. Cl.[7] .............................. A61F 2/06; H04L 27/30
(52) U.S. Cl. ........................................ 375/146; 375/371
(58) Field of Search ................................ 375/130, 135, 375/134, 140, 141, 145, 146, 150, 222, 295, 296, 354, 362, 371

(56) References Cited

U.S. PATENT DOCUMENTS

| | | | |
|---|---|---|---|
| 4,144,579 A | | 3/1979 | Nossen |
| 4,445,118 A | * | 4/1984 | Taylor et al. .......... 342/357.09 |
| 5,016,259 A | | 5/1991 | Hershberger |
| 5,214,676 A | | 5/1993 | Wilkinson |
| 5,796,776 A | * | 8/1998 | Lomp et al. ................. 375/222 |
| 5,872,810 A | * | 2/1999 | Philips et al. ............... 375/222 |
| 5,946,359 A | * | 8/1999 | Tajiri et al. .................. 375/331 |
| 6,049,535 A | * | 4/2000 | Ozukturk et al. ........... 370/335 |
| 6,154,487 A | * | 11/2000 | Murai et al. ................. 375/150 |
| 6,205,167 B1 | * | 3/2001 | Kamgar et al. ............. 375/134 |

FOREIGN PATENT DOCUMENTS

WO　　WO9713325　　4/1997　　............. H03L/7/18

* cited by examiner

Primary Examiner—Stephen Chin
Assistant Examiner—Lenny Jiang
(74) Attorney, Agent, or Firm—John F. Vodopia

(57) ABSTRACT

A CDMA reverse link has a system for providing compensation for phase errors caused by clock jitter in a CDMA reverse link. After filtering, data spread by a pilot PN sequence is supplied to a shift register that produces several data samples for sequential cycles of an internal clock. A memory stores compensation factors representing the clock jitter, pre-calculated for each of the internal clock cycles. A counter counts the internal clock cycles to provide the memory with an address signal indicating a memory location that stores the compensation factor for a current internal clock cycle. Based on the data samples and the compensation factor, an interpolator performs an interpolation algorithm to determine an adjusted spread data value that compensates for phase errors caused by jitter in the internal clock.

20 Claims, 4 Drawing Sheets

COMPENSATION FOR PHASE ERRORS CAUSED BY CLOCK JITTER IN A CDMA COMMUNICATION SYSTEM

BACKGROUND OF THE INVENTION

1. Field of the Invention

The present invention relates generally to wireless communication systems, and more particularly, to a code division multiple access (CDMA) communication system having a circuit for providing compensation for phase errors due to clock jitter.

2. Background Art

Code Division Multiple Access (CDMA) is a form of digital cellular phone service that assigns a code to all speech bits, sends a scrambled transmission of the encoded speech over the air and reassembles the speech to its original format. CDMA combines each phone call with a code which only one cellular phone plucks from the air.

CDMA operates in conjunction with spread spectrum transmission. A transmitter takes the original information signal and combines it with a unique correlating code to produce a radio frequency (RF) signal that occupies a much greater bandwidth than the original signal. RF signals from several transmitters are spread across the same broad frequency spectrum. The dispersed signals are pulled out of the background noise by a receiver which knows the code. By assigning a unique correlating code to each transmitter, several simultaneous conversations can share the same frequency allocation.

A typical CDMA system comprises a plurality of cells or designated regions, a base station associated with each cell and a plurality of mobile units. CDMA systems require transmission schemes which efficiently use an allocated frequency band so that a maximum number of mobile units can be accommodated with a minimum amount of interference. In accordance with CDMA standards, a communication link from a mobile unit to a base station is called a reverse link, and a communication link from a base station to a mobile unit is called a forward link. Communication in the reverse link is particularly difficult because a base station must be able to distinguish among all of the information signals transmitted from mobile units located within its particular cell. To provide communication in the reverse link, a CDMA mobile unit has a transmitter that produces an RF carrier signal based on an information signal.

As shown in FIG. 1 of the drawings, a typical transmitter 20 of a CDMA mobile telephone set has a data input 21 for supplying a binary information sequence to be transmitted. For example, input data may be encoded using a Non-Return to Zero (NRZ) encoding scheme in -which ones and zeroes are represented by opposite and alternating high and low voltages. To utilize the entire available channel bandwidth, the phase of the carrier should be shifted pseudo-randomly according to pseudo-noise (PN) sequences. In CDMA cellular systems, pseudo-random data spreading is defined in the Telecommunication Industry Association (TIA)/ Electronic Industry Association (EIA) Interim Standard TIA/EIA/IS-95-A (May 1995) entitled Mobile Station-Base Station Compatibility Standard for Dual-Mode Wideband Spread Spectrum Cellular System, and incorporated herein as a reference.

To provide quadrature data spreading, input data is processed in in-phase (I) and quadrature-phase (Q) channels of the transmitter 20 using in-phase and quadrature-phased pilot pseudo-noise (PN) sequences PNI and PNQ, respectively, defined in the TIA/EIA/IS-95-A Standard. In accordance with this standard, the PNI and PNQ sequences are periodic signals generated at a rate of 1.2288 Mchip/sec based on characteristic polynomials.

Multipliers 22 and 24 are respectively arranged in I- and Q-channels to multiply the input data by PNI and PNQ sequences. Up-sampling circuits 26 and 28 up-sample output values of the multipliers 22 and 24, respectively, by a factor of 8. In addition, the Q-channel contains a delay circuit for delaying the output of the circuit 28 by ½ chip equal to 4 samples. The outputs of circuits 26 and 29 are supplied to n-tap finite impulse response (FIR) filters 30 and 32 respectively arranged in the I- and Q-channels. The up-sampling circuits 26 and 28, delay circuit 29 and the FIR filters 30 and 32 are defined in the TIA/EIA/IS-95-A standard for a factor 4 up-sampling.

Outputs of the FIR filters 30 and 32 are supplied to digital-to-analog (D/A) converters 34 and 36, respectively. For example, the outputs of the FIR filters 30 and 32 may be represented by 10-bit digital signals. The D/A converters 34 and 36 produce analog signals Vi and Vq respectively supplied via anti-aliasing low-pass filters (LPF) 38 and 40 to I and Q inputs of a transmitting circuit 42 that performs offset quadrature phase-shift keying (QPSK) to produce a modulated radio-frequency signal transmitted to a base station using an antenna 44.

To synchronize signal processing in the I- and Q-channels, the transmitter 20 comprises a digital synthesizer 46 that produces an internal clock signal in response to an external clock signal. The internal clock signal is supplied to the FIR filters 30 and 32 and to the D/A converters 34 and 36.

To support signal processing in the I- and Q-channels, the internal clock frequency of the transmitter 20 must be equal to a chip rate multiplied by 8. As the standard chip rate is equal to 1.2288 Mchip/sec, the internal clock must be produced at a frequency fx8 equal to 9.8304 MHz. However, to meet the frequency plan requirements of a CDMA mobile telephone, a reference clock supplied to the transmitter 20 may have a frequency fref different from 9.8304 MHz. For example, fref may be equal to 14.4 MHz.

In this case, fref/fx8=14.4 MHz/9.8304 MHz=375/156= 1.468. Thus, in 375 cycles of the reference clock, 256 cycles of the internal clock are produced. Therefore, in order to produce an internal clock signal with 256 cycles, 119 clock cycles have to be removed from the 375 cycle reference clock.

The closest digital division ratio to 1.468 is 1.5. If this division ratio occurs over M cycles of the reference clock, then the number N of internal clock cycles removed over M cycles may be expressed as N=M−(M/1.5)=119. Therefore, M=357. Accordingly, 357 out of 375 reference clock cycles are converted with the division ratio equal to 1.5, and for the remaining 18 cycles, the division ratio is equal to 1.

Thus, during the conversion of the reference clock into the internal clock, the division ratio must be changed, for example, from 1.5 to 1. As a result, jitter in the internal clock occurs.

For example, if the division ratio is changed from 1.5 to 1, the reference time t changes by a half cycle of the reference clock. The reference time change Δt is equal to ½ of $1/14.4$ MHz=$1/28.8$ MHz=34.7 nanoseconds.

The clock jitter can be considered as parasitic "ramped phase" modulation illustrated in FIG. 2. Such modulation causes substantial phase errors at the output of the transmitting circuit 42. For example, the parasitic phase step ΔΘp–p caused by the reference time change At can be expressed as follows:

$$\Delta\Theta p-p=(\Delta t/Tx8)\times 2\pi,$$

where Tx8 is the period of the internal clock.
Accordingly, $\Delta\Theta p-p=(9.8304/28.8)\times 2\pi=2.143$ radian=34% of 1 cycle. In the above-illustrated example, the root-mean-square phase error ΔΘrms produced as a result of the clockjitter can be expressed as $\Delta\Theta rms=\Delta\Theta/\sqrt{12}=0.6186$ rad.

The phase error due to clock jitter causes an error voltage at outputs of the D/A converters. As a result, the transmitter 20 has a high level of spurious emissions radiated at frequencies outside the assigned CDMA channel. As shown in FIG. 3, which illustrates a simulated spectrum of a transmitted RF signal in a conventional CDMA reverse link, the transmitted RF signal has poor adjacent channel power ratio (ACPR), which characterizes spurious emissions outside the assigned CDMA channel. Spurious emissions and the method of their measurement are defined in the TIA/EIA/IS-98-A Interim Standard entitled Recommended Minimum Performance Standards for Dual-Mode Wideband Spread Spectrum Cellular Mobile Stations. The ACPR is the ratio of the adjacent channel power to the power of the in-channel signal. In accordance with the TIA/EIA/IS-98-A Interim Standard, the adjacent channel power for 30 kHz bandwidth is measured at the 900 kHz offset from the central frequency of the in-channel signal. In the example shown in FIG. 3, the in-channel signal power at the central frequency is about 43 dBm, and the adjacent channel power is about 14 dBm. Thus, the difference between these values representing the ACPR is equal to about 29 dB.

It would be desirable to provide compensation for phase errors caused by clock jitter, in order to improve the ACPR of a CDMA telephone set.

SUMMARY OF THE INVENTION

Accordingly, an advantage of the invention is in providing compensation for phase errors caused by clock jitter to improve the ACPR of a CDMA transceiver.

This and other advantages of the present invention are achieved at least in part by providing a spread spectrum communication device that comprises a data spreading circuit for spreading data by a PN sequence and filtering the spread data, a clock generation circuit for generating an internal clock signal based on a reference clock signal, and an interpolation circuit for performing interpolation of filtered spread data formed by the data spreading circuit to produce an adjusted spread data value that compensates for a phase error caused by jitter in the internal clock signal.

In accordance with a preferred embodiment of the invention, the interpolation circuit may comprise a shift register controlled by the internal clock signal to produce samples of the filtered spread data for sequential internal clock cycles. Further, the interpolation circuit may comprise a memory for storing compensation factors representing the internal clock jitter. The compensation factors may be pre-calculated for each internal clock cycle. An address generator controlled by the internal clock signal may provide the memory with an address signal indicating a memory location that stores a compensation factor for a current internal clock cycle.

Based on the samples of the filtered spread data and the compensation factors, the interpolator calculates the adjusted spread data value. For example, the interpolation circuit may perform a linear interpolation algorithm to determine the adjusted spread data value. In response to the adjusted spread data values, a digital-to-analog converter may produce voltage compensated for the clock jitter.

The clock generation circuit may convert cycles of the reference clock signal into the cycles of the internal clock signal using at least first and second division ratios. To reduce the clock jitter, the internal clock cycles produced using the second division ratio may be evenly distributed over the internal clock cycles produced using the first division ratio.

In accordance with one aspect of the invention, a system for compensating for phase errors caused by the clock jitter is provided in a CDMA reverse link. The compensating system comprises a sampling circuit responsive to digital data spread by a PN sequence and filtered by a filter for producing spread data samples for sequential internal clock cycles, a memory for storing compensation factors representing the internal clock jitter, and an interpolator that performs interpolation of spread data to determine adjusted spread data values that compensate for the phase errors caused by the clock jitter.

In accordance with a method of the present invention, the following steps are carried out to provide compensation for phase errors caused by jitter in the internal clock signal:

sampling digital data spread by a PN sequence and filtered by a filter to produce spread data samples for several sequential internal clock cycles, and interpolating the spread data samples using compensation factors to determine an adjusted spread data value that compensates for the phase errors caused by the clock jitter.

Still other objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

DETAILED DESCRIPTION OF THE INVENTION

Although the invention has general applicability in the field of signal processing, the best mode for practicing the invention is based in part on the realization of a reverse link in a CDMA system.

Figure 4:
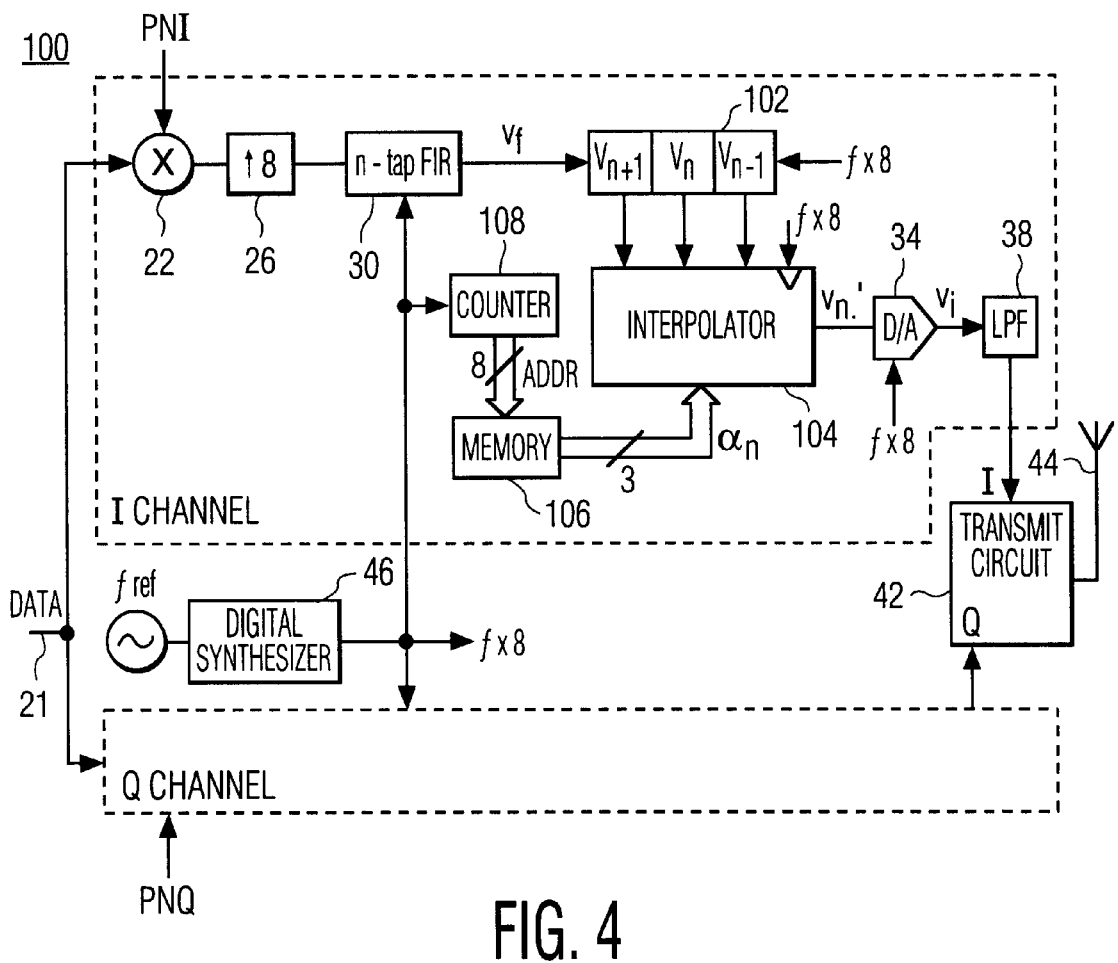
FIG. 4 is a block-diagram of a transmitter in a CDMA telephone set of the present invention.

FIG. 4 shows a transmitter 100 of a CDMA mobile telephone set in accordance with the present invention.

Figure 1:
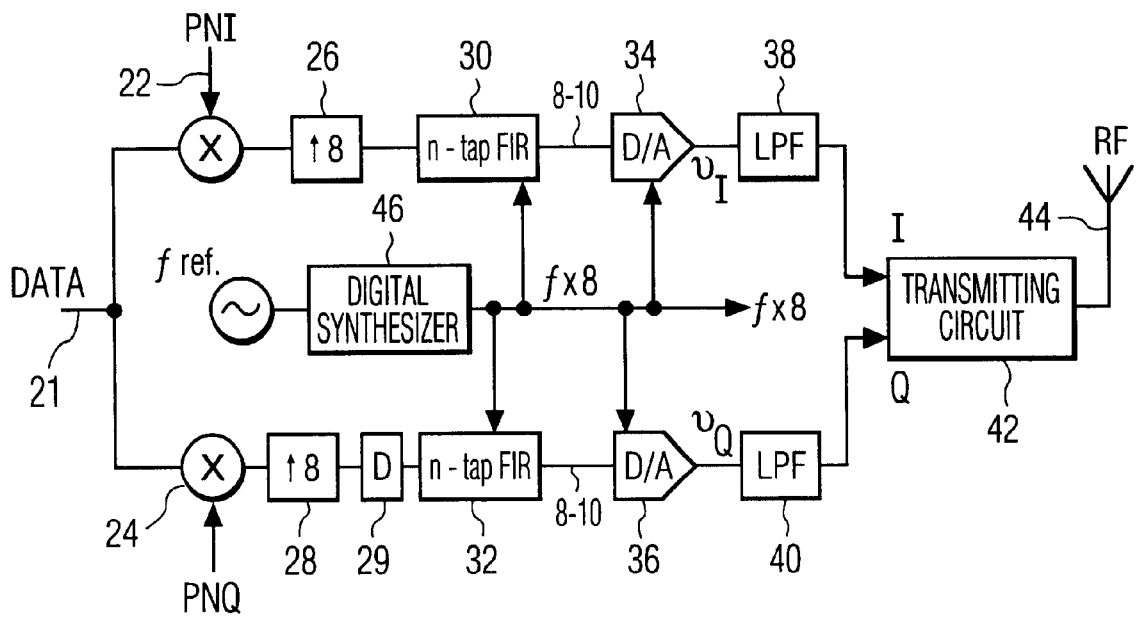
FIG. 1 is a block-diagram of a conventional transmitter in a CDMA telephone set
Figure 2:
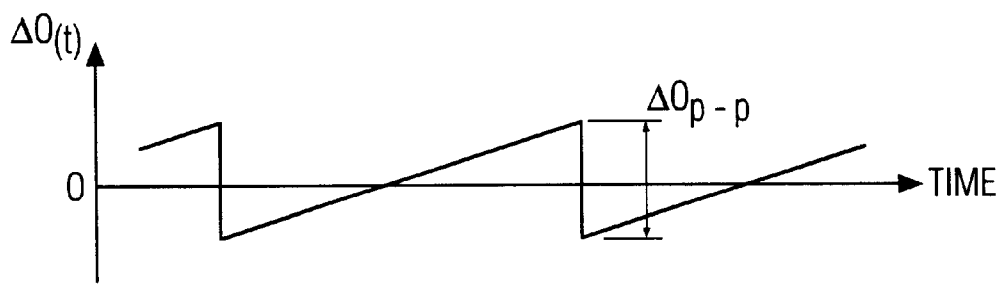
FIG. 2 is a diagram illustrating phase errors caused by jitter in a clock signal.
Figure 3:
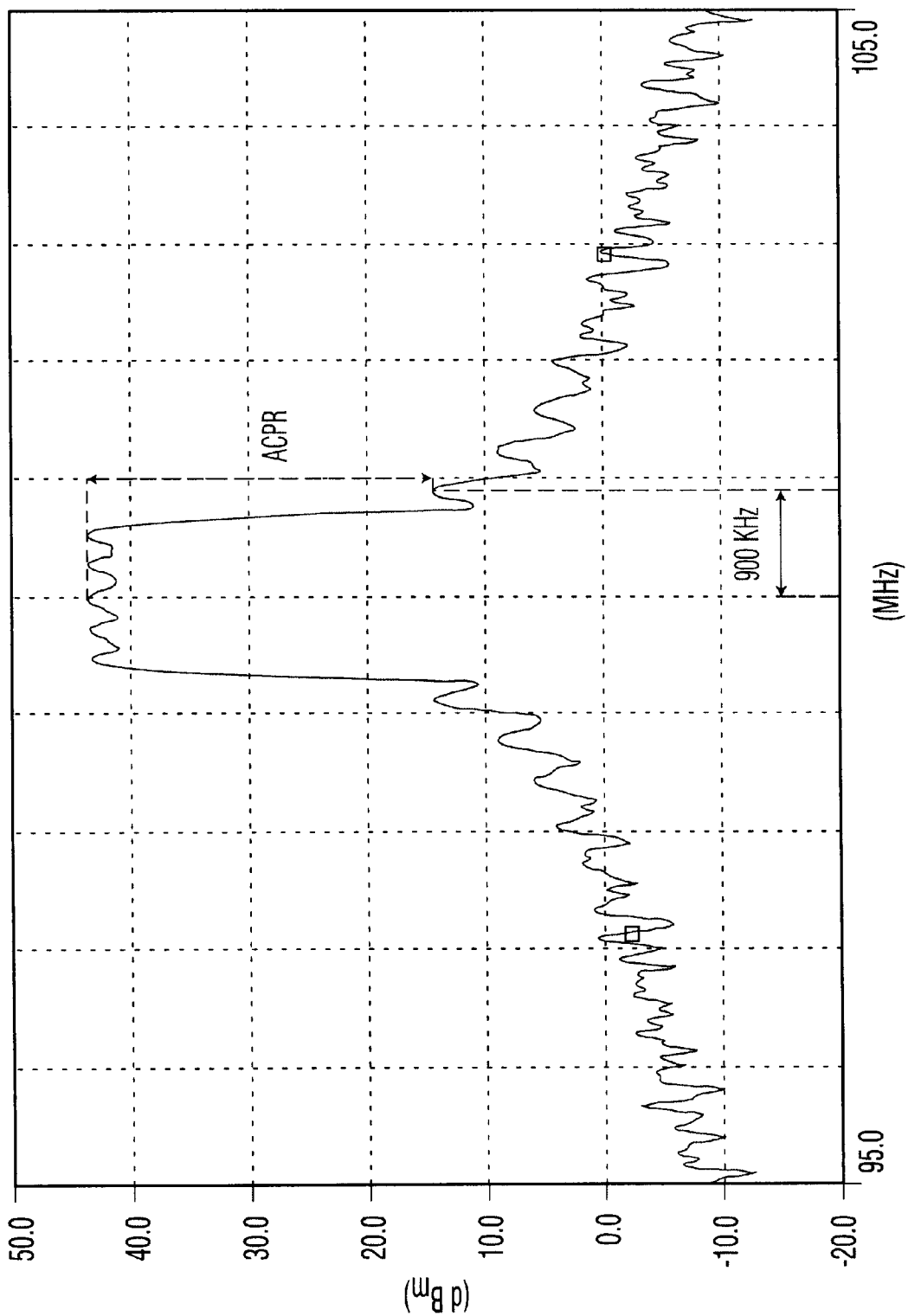
FIG. 3 is a diagram illustrating a simulated spectrum of a transmitted RF signal in a conventional CDMA reverse link.

Elements of the transmitter 100 similar to those depicted in FIG. 1 bear like reference numbers. The transmitter 100 comprises an in-phase (I) channel and a quadrature-phase (Q) channel that respectively drive in-phase and quadrature-phase inputs of a transmitting circuit 42 to produce a QAM radio-frequency signal transmitted to a base station using an antenna 44. An information sequence, which may be encoded using an NRZ encoding scheme, is supplied to the I- and Q-channels via a data input 21.

In accordance with the TIA/EIA/IS-95-A Standard for spread spectrum cellular systems, an in-phase pilot PN sequence PNI is supplied to the I-channel, and a quadrature-phase pilot PN sequence PNQ is provided to the Q- channel. These periodic sequences are generated based on characteristic polynomials at a rate equal to 1.2288 Mchip/sec.

A reference signal provided in the mobile telephone set has a frequency fref selected to maintain the required CDMA channel frequency. For example, fref may be equal to 14.4 MHz. Based on the reference signal, a digital synthesizer 46 produces an internal clock signal at a frequency fx8, which may be equal to 9.8304 MHz., i.e. to a chip rate multiplied by 8. The internal clock signal is supplied to the I- and Q-channels to provide synchronization of their operations.

As discussed above, if fref=14.4 MHz, and fx8=9.8304 MHz, the digital synthesizer 46 produces 256 cycles of the internal clock in 375 cycles of the reference clock. Therefore, when the reference clock signal is being converted into the internal clock, 119 cycles of the internal clock have to be removed from 375 cycles of the reference clock. As a single division ratio cannot be used to convert the reference clock signal into the internal clock signal, 357 out of 375 reference clock cycles may be converted with the division ratio equal to 1.5, and for the remaining 18 cycles, the division ratio may be set to 1. This change in the division ratio causes jitter in the internal clock produced as a result of the conversion.

To reduce the clock jitter, the digital synthesizer 46 evenly distributes the remaining 18 cycles over the 375 reference clock cycles. As 375/18=20.8333 . . . =20+0.8333 . . . , 20 cycles are used for a repetition pattern, in which 19 cycles converted with the division ratio 1.5 are followed by one cycle with the division ratio 1. Thus, 18×0.8333 . . . =15 cycles with the division ratio 1.5 are left. The synthesizer 46 spreads these 15 cycles uniformly over the 18 cycles so as to produce 15 blocks of 21 cycles (20 cycles of division ratio 1.5 and one cycle of division ratio 1) followed by 3 blocks of 20 cycles (19 cycles of division ratio 1.5 and 1 cycle of division ratio 1).

For further reduction of the clock jitter, the digital synthesizer 46 forms the following sequence to uniformly distribute 3 blocks of 20 cycles over 15 blocks of 21 cycles:

5 cycles of 21 cycles, of which 20 blocks have division ratio 1.5, and 1 cycle has division ratio 1;

1 block of 20 cycles, of which 19 cycles have division ratio 1.5, and 1 cycle has division ratio 1;

5 cycles of 21 cycles, of which 20 blocks have division ratio 1.5, and 1 cycles has division ratio 1;

1 block of 20 cycles, of which 19 cycles have division ratio 1.5, and 1 cycle has division ratio 1;

5 cycles of 21 cycles, of which 20 blocks have division ratio 1.5, and 1 cycle has division ratio 1; and 1 block of 20 cycles, of which 19 cycles have division ratio 1.5, and 1 cycle has division ratio 1.

Although the above-described example illustrates the conversion of a 14.4 MHz reference clock into a 9.8304 MHz CDMA internal clock, one skilled in the art will realize that the disclosed technique is applicable to producing a clock signal of any frequency from any reference clock.

The illustrated above clock conversion technique allows the clock jitter to be reduced. However, even the reduced clock jitter causes substantial phase errors. Therefore, in accordance with the present invention, each of the I and Q channels in the CDMA transmitter 100 comprises a phase error compensation system that provides compensation for phase errors caused by clock jitter.

In accordance with the present invention, the I- and Q-channels of the CDMA transmitter 100 have similar structures except for ½ chip delay provided in the Q-channel. Therefore, only elements of the I-channel are shown in FIG. 4 and described below.

The I-channel of the CDMA transmitter 100 that handles the data spread by the in-phase pilot PN sequence comprises a multiplier 22 that multiplies NRZ data from the data input 21 by the PNI sequence. The output of the multiplier 22 is coupled to an up-sampling circuit 26 that provides up sampling of the multiplier output value by a factor of 8. The up-sampled value produced by the up-sampling circuit 26 is supplied to a n-tap FIR filter 30 that performs signal filtering prescribed by the TIA/EIA/IS-95-A Standard. The internal clock signal fx8 is provided to the FIR filter 30 to support signal filtering.

A signal Vf produced at the output of the FIR filter 30 is supplied to a three-stage shift register 102. For example, the signal Vf may be represented by a 10-bit word. The shift register 102 is controlled by the internal clock fx8 to produce three samples $V_{n-1}$, $V_n$ and $V_{n+1}$ of the signal Vf corresponding to three sequential cycles of the internal clock fx8.

An interpolator 104 is coupled to outputs of the shift register 102 to receive the samples $V_{n-1}$, $V_n$ and $V_{n+1}$. As will be explained in more detail later, the interpolator 104 implements a linear interpolation algorithm to adjust the value $V_n$ so as to compensate for a phase error caused by internal clock jitter. Compensation factors $\alpha_n$ stored in a memory 106 are used for performing the interpolation. The memory 106 has 256 locations for storing a 3-bit compensation factor $\alpha_n$ representing the internal clock jitter for each of 256 cycles of the internal clock fx8. Using the compensation factor $\alpha_n$, the interpolator 104 produces an adjusted value $V_n'$ of the spread data generated at the output of the FIR filter 30. The interpolator 104 may be implemented by a hardware or software device that performs logical operations required to carry out a prescribed interpolation algorithm. A modulus 256 counter 108 counts the internal clock cycles to provide an 8-bit address signal indicating the memory location that stores the compensation factor $\alpha_n$ for a current internal clock cycle.

The adjusted value $V_n'$ is supplied to a digital-to-analog (D/A) converter 34 controlled by the internal clock fx8 to produce analog representation Vi of the adjusted I-channel signal. Via an anti-aliasing low-pass filter 38, the analog signal Vi is supplied to the I-input of the transmitting circuit 42.

Figure 5:
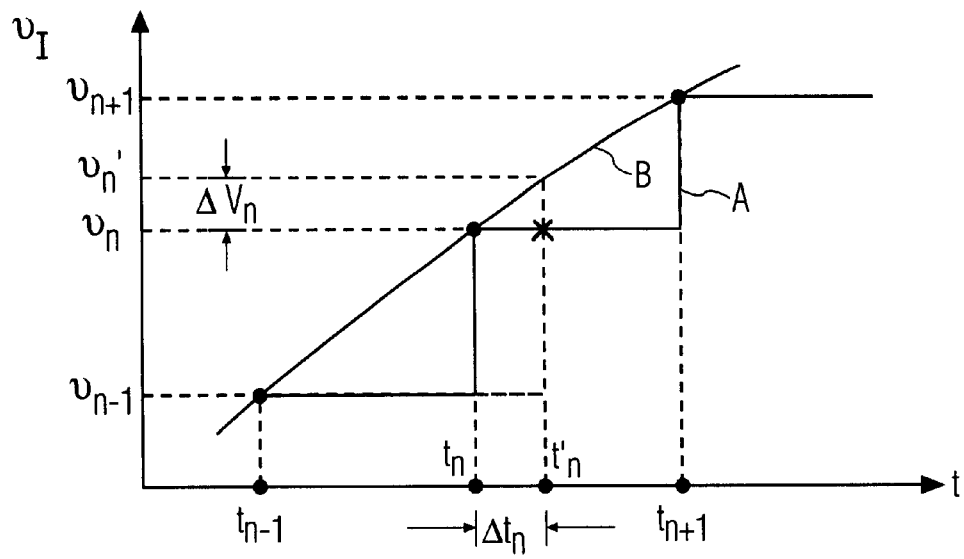
FIG. 5 is a diagram illustrating clock jitter compensation technique in accordance with the present invention.

To illustrate the compensation technique in accordance with the present invention, FIG. 5 shows curves A and B respectively representing an exemplary signal Vi at the output of the D/A converter 34 with and without clock jitter. Due to jitter $\Delta t_n = t_n' - t_n$ in the internal clock supplied to the D/A converter 34, an error occurs in the voltage at the output of the D/A converter 34 represented by voltage $\Delta V_n = V_n' - V_n$. Thus, without compensation, instead of voltage $V_n'$, on un-compensated line A, voltage $V_n$ would be produced at time $t_n'$.

In accordance with the present invention, the interpolator 104 performs linear interpolation to calculate the value $V_n'$ at time $t_n'$ and outputs the calculated value $V_n'$ instead of the value $V_n$ which would otherwise have been produced at this moment. A linear interpolation algorithm that can be used to calculate $V_n'$ is as follows:

For $\Delta t_n > 0$, $V_n'(t_{n'}) = V_n + (\Delta t_n/Tx8)(V_{n+1} - V_n)$.

For $\Delta t_n < 0$, $V_n'(t_{n'}) = V_n + (\Delta t_n/Tx8)(V_n - V_{n-1})$.

where $Tx8 = 1/fx8$ is a period of the internal clock.

To simplify these expressions, $\Delta t_n/Tx8$ may be replaced with a compensation factor $\alpha_n$. Then, the linear interpolation algorithm performed by the interpolator 104 can be expressed as follows:

$V_n'(t_{n'}) = V_n + \alpha_n(V_{n+1} - V_n)$, for $\alpha_n > 0$ $V_n'(t_{n'}) = V_n + \alpha_n(V_n - V_{n-1})$, for $\alpha_n < 0$ $V_n'(t_{n'}) = V_n$, for $\alpha_n = 0$.

As discussed above, the phase step $\Delta\Theta p$–p caused by the clock jitter is equal to 34% of 1 cycle. Therefore, absolute values of compensation factors $/\alpha_n/ \leq 0.34$. To simplify the hardware used for performing the interpolation algorithm the value of $\alpha_n$ can be rounded in steps of 0.1. Thus, $\alpha_n \kappa \{-0.3, -0.2, -0.1, 0, 0.1, 0.2, 0.3\}$.

Accordingly, the shift register 102 controlled by the internal clock signal fx8 produces samples $V_{n+1}$, $V_n$ and $V_{n-1}$ for three sequential cycles of the internal clock. The counter 108 counts cycles of the internal clock to generate an address signal indicating a current cycle of the internal clock. The memory 106 stores the compensation factors $\alpha_n = \Delta t_n/Tx8$ pre-calculated for each of 256 internal clock cycles. The address signal is supplied to the memory 106 to retrieve the compensation factor $\alpha_n$ for the current cycle.

Based on the compensation factor $\alpha_n$ read from the memory 106, the interpolator 104 performs the linear interpolation algorithm defined above to determine the adjusted value $V_n'$ of the data spread by the I pilot PN sequence and filtered by the filter 30. Thus, the interpolator 104 outputs the values $V_n'$ adjusted for each internal clock cycle to compensate for phase errors caused by the clock jitter. As a result, the signal Vi produced by the D/A converter 34 is to a large extent free of the phase errors caused by the clock jitter. Although the present invention is described with the example of a linear interpolation algorithm, one skilled in the art will realize that the interpolator can perform any prescribed interpolation algorithm to produce an adjusted value of spread data that compensates for phase errors due to the clock jitter.

Via the low-pass filter 38, the signal Vi is supplied to the in-phase input I of the transmitting circuit 42. As discussed above, the quadrature-phase input Q of the transmitting circuit 42 is driven by the signal Vq produced by the Q-channel of the transmitter 100. The Q-channel has a shift register and interpolator similar to the shift register 102 and the interpolator 104 of the I-channel. The memory 106 and the counter 108 are shared by the I- and Q-channels to supply the interpolators in both channels with common compensation factors $\alpha_n$.

In addition to the elements of the I-channel, the Q-channel contains the delay circuit 29 for delaying the output signal of the up-sampling circuit by ½ chip, as defined in the TIA/EIA/IS-95-A Standard, to enable the transmitting circuit 42 to perform offset quadrature phase-shift keying (QPSK). A modulated radio-frequency signal generated by the transmitting circuit 42 is sent via the antenna 44 to the base station.

Figure 6:
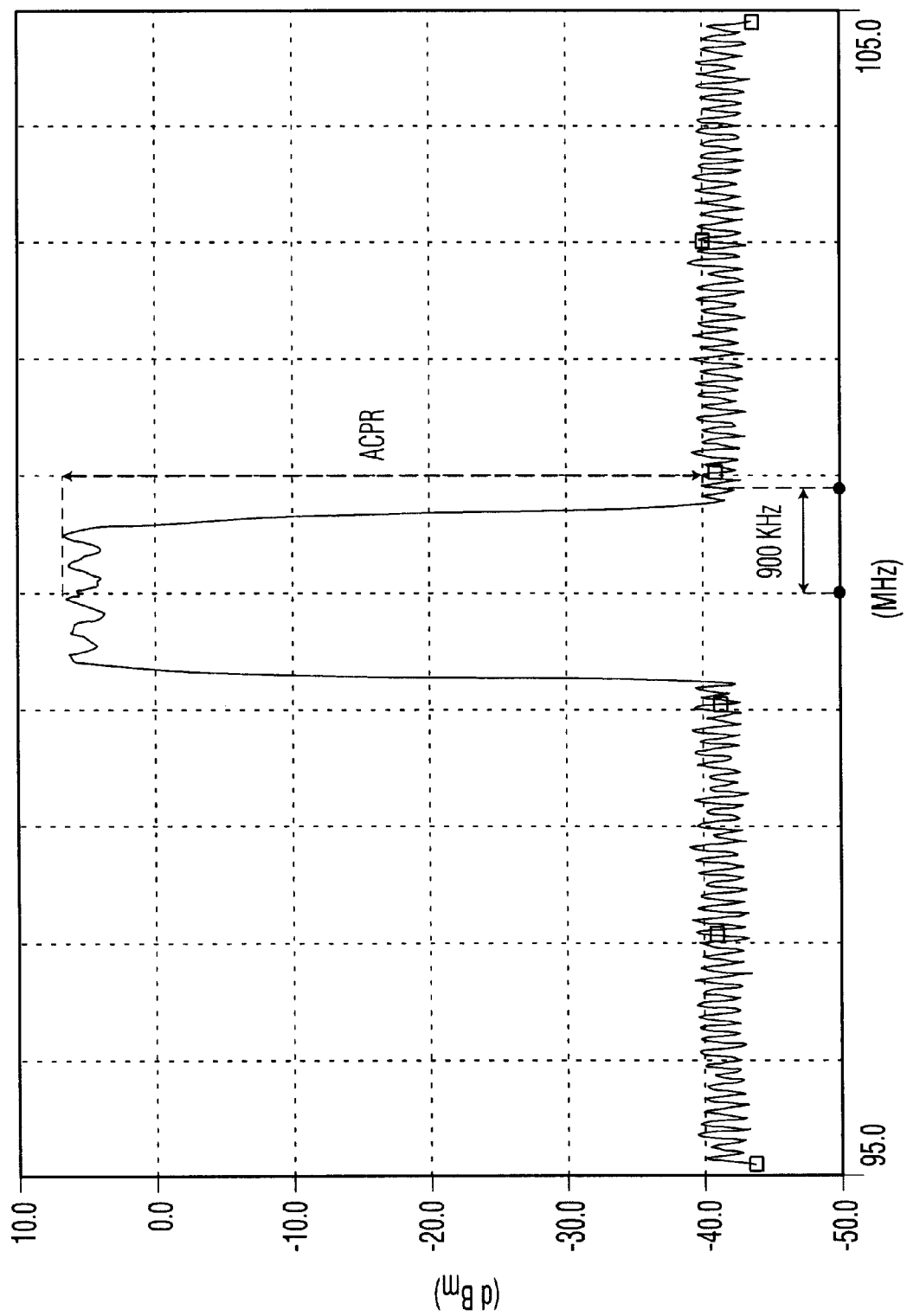
FIG. 6 is a diagram showing a simulated spectrum of a transmitted RF signal in the CDMA reverse link of the present invention.

Thus, the present invention provides compensation for phase errors caused by clock jitter. As shown in FIG. 6 that illustrates a simulated spectrum of a transmitted radio-frequency signal in the CDMA reverse link of the present invention, the adjacent channel power ratio (ACPR) of the radio-frequency signal is substantially improved compared to conventional CDMA systems. In the example illustrated in FIG. 6, the in-channel power at the central frequency is about 6 dBm, whereas the adjacent channel power measured at the 900 kHz offset from the central frequency is about –40 dBm. The difference between this values representing the ACPR is equal to about 46 dB.

There accordingly has been described a system for providing compensation for phase errors caused by clock jitter in a CDMA reverse link. After filtering, data spread by a pilot PN sequence is supplied to a shift register that produces several data samples for sequential cycles of an internal clock. A memory stores compensation factors pre-calculated for each of the internal clock cycles. A counter counts the internal clock cycles to supply the memory with an address signal indicating a memory location which stores the compensation factor for a current internal clock cycle. Based on the data samples and compensation factor, an interpolator performs an interpolation algorithm to produce an adjusted spread data value that compensates for phase errors caused by jitter in the internal clock.

In this disclosure, there are shown and described only the preferred embodiments of the invention, but it is to be understood that the invention is capable of changes and modifications within the scope of the inventive concept as expressed herein.

What is claimed is:

1. A spread spectrum communication system, comprising:
   a data spreading circuit for spreading data by a PN sequence and filtering the spread data,
   a clock producing circuit for generating an internal clock signal based on a reference clock signal, and
   an interpolation circuit for performing interpolation of filtered spread data formed by the data spreading circuit to determine an adjusted spread data value that compensates for a phase error caused by jitter in the internal clock signal.

2. The system of claim 1, wherein said interpolation circuit comprises a shift register controlled by the internal clock signal to produce samples of the filtered spread data for sequential internal clock cycles.

3. The system of claim 2, wherein said interpolation circuit further comprises a memory for storing compensation factors precalculated for each internal clock cycle to compensate for a phase error due to the internal clock jitter.

4. The system of claim 3, wherein said compensation factors represent the internal clock jitter.

5. The system of claim 4, wherein said interpolation circuit further comprises an address generator controlled by the internal clock signal for providing said memory with an address signal indicating a memory location that stores a compensation factor for a current internal clock cycle.

6. The system of claim 5, wherein said interpolation circuit further comprises an interpolator responsive to the samples of the filtered spread data and the compensation factors for calculating the adjusted spread data value.

7. The system of claim 6, wherein said interpolation circuit performs a linear interpolation algorithm to calculate the adjusted spread data value.

8. The system of claim 7, further comprising a digital-to-analog converter responsive to the adjusted spread data value to produce a voltage compensated for the clock jitter.

9. The system of claim 1, wherein said clock producing circuit converts cycles of the reference clock signal into the cycles of the internal clock signal using at least first and second division ratios.

10. The system of claim 9, wherein said clock producing circuit evenly distributes the internal clock cycles produced using the second division ratio over the internal clock cycles produced using the first division ratio.

11. In a CDMA reverse link having a clock generator for producing an internal clock signal based on a reference clock signal, a system for compensating for phase errors caused by jitter in the internal clock signal, comprising:

a sampling circuit responsive to digital data spread by a PN sequence and filtered by a filter for producing spread data samples for sequential internal clock cycles, a memory for storing compensation factors representing the internal clock jitter, and an interpolator responsive to the spread data samples and the compensation factors for performing interpolation of filtered spread data to determine adjusted spread data values that compensate for the phase errors caused by the internal clock jitter.

12. The system of claim 11, further comprising a counter controlled by the internal clock signal for providing said memory with an address signal indicating a memory location that stores a compensation factor for a required internal clock cycle.

13. The system of claim 11, wherein said sampling circuit comprises a shift register controlled by the internal clock signal.

14. The system of claim 11, wherein said compensation factors are pre-calculated based on the internal clock jitter and period of the internal clock signal.

15. The system of claim 11, wherein said interpolator performs linear interpolation of the filtered spread data.

16. In a spread spectrum system having an internal clock generator for producing an internal clock signal based on a reference signal, a method of compensating for phase errors caused by jitter in the internal clock signal, comprising the steps of:

sampling digital data spread by a PN sequence and filtered by a filter to produce spread data samples for several sequential internal clock cycles, and interpolating the spread data samples using compensation factors to determine an adjusted spread data value that compensates for the phase errors caused by the clock jitter.

17. The method of claim 16, wherein a step of sampling comprises the step of shifting the spread digital data controlled by the internal clock signal.

18. The method of claim 16, wherein the compensation factors represent the jitter in the internal clock signal.

19. The method of claim 18, wherein the compensation factors are pre-calculated before the interpolating step.

20. The method of claim 16, wherein said interpolating comprises the step of performing a linear interpolation algorithm.

* * * * *